(No Model.)
G. B. HOWELL.
COUPLING FOR WATER CLOSETS.
No. 484,318. Patented Oct. 11, 1892.
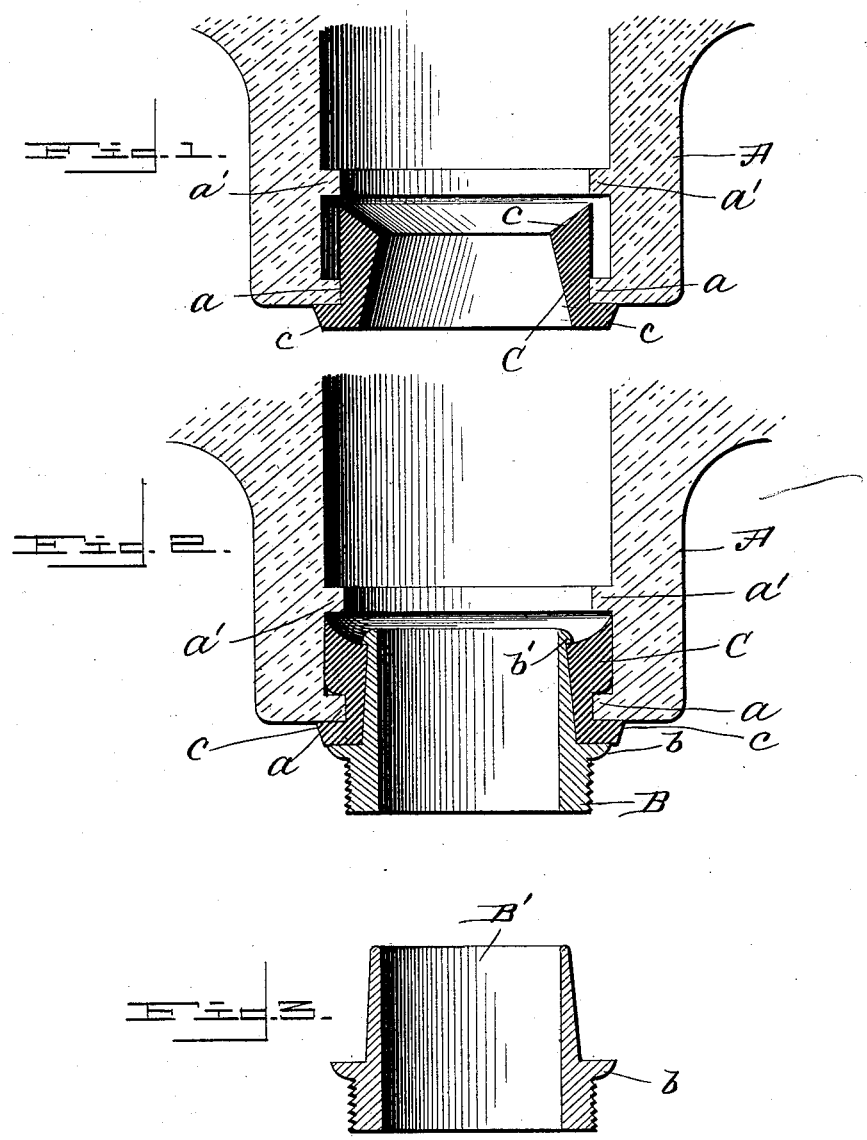
Witnesses
W. H. Humphrey.
Chas. E. Pindar.
Inventor
George B Howell
By Butterworth & Dowell
his Attorneys

UNITED STATES PATENT OFFICE.

GEORGE B. HOWELL, OF PHILADELPHIA, PENNSYLVANIA.

COUPLING FOR WATER-CLOSETS.

SPECIFICATION forming part of Letters Patent No. 484,318, dated October 11, 1892.

Application filed June 7, 1892. Serial No. 435,804. (No model.)

*To all whom it may concern:*

Be it known that I, GEORGE B. HOWELL, a citizen of the United States, residing at Philadelphia, in the county of Philadelphia and State of Pennsylvania, have invented certain new and useful Improvements in Couplings for Water-Closets; and I do hereby declare the following to be a full, clear, and exact description of the invention, such as will enable others skilled in the art to which it appertains to make and use the same.

My invention relates to pipe-couplings for earthen water-closets or other fixtures made of earthenware in which the connection between the bowl and flush-pipe, or other fixture and the pipe to be attached thereto, must be made from the outside. It has been the common practice heretofore to make the connection between the earthen closet and attached metallic pipe by pouring molten sulphur between the coupling-section and the earthenware socket, thereby forming a rigid joint which, in the usual wear and tear of a water-closet, is very likely to break the earthenware, on account of the rigidity of the joint. These objections have been obviated to some extent by interposing an elastic gasket or packing-ring between the earthen socket and metallic coupling-section inserted therein; but in these latter contrivances it has been necessary to use lock-nuts and washers or other means for compressing or clamping the packing between the metal piece and earthen socket, so as to form a tight joint, and by thus multiplying the parts the cost of manufacture is increased, the coupling is rendered more or less complex and difficult to attach, and the joint thus formed is practically rigid or inflexible.

The primary object of my invention is to provide a coupling by which a perfectly-tight though slightly-yielding or flexible connection may be made between the earthenware fixture and metallic pipe attached thereto, and thereby prevent breakage which frequently results, in practice, from a rigid joint.

A further object is to simplify the construction, reduce the cost of manufacture, and increase the efficiency and durability of couplings of this character.

The invention will first be described with reference to the accompanying drawings, and then pointed out in the claims at the end of this description.

Referring to the drawings by letters of reference, Figure 1 represents in section so much of an earthenware fixture and inserted packing-ring as is necessary to illustrate my invention. Fig. 2 is a similar view illustrating the coupling-piece and packing-ring locked to the earthen fixture. Fig. 3 is a detail sectional view of a modification of the metallic coupling piece or nipple.

A denotes a hollow projection or socket forming a part of the water-closet bowl or other earthen fixture to which a pipe is to be attached.

B denotes a nipple or coupling-piece, which may connect with the flush-pipe or other pipe to be attached to the fixture A.

The socket A is provided at its end with an interior annular projection or lip $a$, and may also have slightly in rear of the latter a similar projection or flange $a'$, both of which may be formed in a single piece with the fixture in the baking.

The nipple B is formed with an exterior annular projection or collar $b$, intermediate the ends thereof, and may also have a terminal projection or collar $b'$, though the latter may in some cases be dispensed with.

C denotes a rubber gasket or elastic packing-ring, which is adapted to fit within the earthen socket, so as to protect the latter from contact with the metal of the nipple B when the latter is inserted therein and to be expanded by the nipple so as to bear against the walls of the socket and form a perfectly-tight joint. The gasket may consist of a molded rubber ring having a conical opening through the same to receive the end of the nipple or coupling-piece and a collar $c$ to protect the rim of the socket and prevent the ring from being forced into the socket when the nipple is inserted. The inner end of the ring C may also be beveled inwardly, as at $c'$, to facilitate the expansion of the ring and the sealing of the joint when the parts are in proper position. The insertible end of the nipple B may also be made slightly tapering, if desired, to facilitate its introduction into the conical opening of the ring, and may be exteriorly screw-threaded at its opposite end for connection with a pipe; but the diameter of the nipple should be such that the inner thick portion of the rubber ring will be expanded and caused to bear tightly against the interior wall of the socket.

To make the connection, the gasket is first inserted in the socket, as indicated in Fig. 1, and thereupon the nipple is forced into the gasket, so as to expand the thick portion of the rubber ring against the inner wall of the socket, as indicated in Fig. 2, in which position the parts will be securely locked together, the overhanging flange $b'$ preventing displacement of the nipple and the ring being confined in the socket by the annular interior projection or flange $a$ of the latter; but when it is not desirable to form a lock-joint, a coupling-section B', Fig. 3, having an intermediate collar $b$, only, may be employed, so as to render the coupling detachable. The inner flange $a'$ of the socket may also be omitted, though I preferably use the same as a protection to the gasket and to strengthen the socket. Furthermore, while my invention is particularly applicable to fixtures of earthenware on account of the impracticability of threading the same and the undesirability of using bolts therewith, it is also capable of other uses and may be advantageously employed for many purposes and wherever a similar joint is desirable.

Having thus fully described my invention, what I claim as new, and desire to secure by Letters Patent of the United States, is—

1. In combination with the water-closet or similar fixture of earthenware provided with an opening having an interior annular projection or flange, the elastic gasket having a conical opening therethrough, and a nipple or coupling-piece adapted to be forced into said conical opening so as to expand the gasket within the opening of the fixture and secure the parts together without other fastening means, substantially as described.

2. In combination with the fixture having an opening therein provided with an interior annular projection or flange, the elastic gasket having a conical opening through the same, and the nipple or coupling-piece having a collar intermediate the ends thereof, and a second collar or lip adapted to overhang the inner end of the gasket when the parts are inserted in the opening of the fixture so as to form a lock-joint, substantially as described.

In testimony whereof I affix my signature in presence of two witnesses.

GEORGE B. HOWELL.

Witnesses:
WILSON G. JOHNSON,
CHAS. S. HIMMELWRIGHT.